United States Patent
Khan et al.

(10) Patent No.: US 11,726,228 B2
(45) Date of Patent: Aug. 15, 2023

(54) ENGINEERING COMPLETION AND SELECTIVE FRACTURING OF LATERAL WELLBORES

(71) Applicant: Schlumberger Technology Corporation, Sugar Land, TX (US)

(72) Inventors: Modhar Khan, Katy, TX (US); Robert Utter, Sugar Land, TX (US); Irlan Amir, Katy, TX (US); Dmitriy Potapenko, Sugar Land, TX (US); Joseph Gremillion, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 21 days.

(21) Appl. No.: 17/310,695

(22) PCT Filed: Feb. 18, 2020

(86) PCT No.: PCT/US2020/018538
§ 371 (c)(1),
(2) Date: Aug. 18, 2021

(87) PCT Pub. No.: WO2020/172106
PCT Pub. Date: Aug. 27, 2020

(65) Prior Publication Data
US 2022/0035063 A1    Feb. 3, 2022

Related U.S. Application Data

(60) Provisional application No. 62/807,112, filed on Feb. 18, 2019.

(51) Int. Cl.
*E21B 49/00* (2006.01)
*E21B 43/26* (2006.01)
(Continued)

(52) U.S. Cl.
CPC ............ *G01V 3/26* (2013.01); *E21B 43/26* (2013.01); *E21B 49/003* (2013.01); *G01V 3/38* (2013.01)

(58) Field of Classification Search
CPC ........ E21B 7/046; E21B 49/003; E21B 47/13; E21B 43/14; E21B 43/26
See application file for complete search history.

(56) References Cited

U.S. PATENT DOCUMENTS 8,938,363 B2    1/2015  Beasley et al.
9,890,616 B2 *  2/2018  Pabon .................... E21B 44/00
(Continued)

OTHER PUBLICATIONS

International Search Report and Written Opinion issued in International Patent application PCT/US2020/018538 dated Jun. 24, 2020, 11 pages.

*Primary Examiner* — Kenneth L Thompson
(74) *Attorney, Agent, or Firm* — Jeffrey D. Frantz

(57) ABSTRACT

A method for completing a wellbore traversing a subterranean formation includes making electromagnetic resistivity measurements along a lateral section of the wellbore. The resistivity measurements are evaluated to estimate a water content of the subterranean formation along the lateral section. The formation is fractured at selected regions along the lateral section at which the water content is below a threshold and avoiding regions at which the water content is above the threshold.

10 Claims, 5 Drawing Sheets

(51) Int. Cl.
    *G01V 3/26*          (2006.01)
    *G01V 3/38*          (2006.01)

(56) References Cited

U.S. PATENT DOCUMENTS

| | | | |
|---|---|---|---|
| 10,072,481 B2 * | 9/2018 | Bordoloi | E21B 49/003 |
| 10,428,642 B2 | 10/2019 | Carpenter | |
| 10,480,311 B2 * | 11/2019 | Stolyarov | E21B 47/095 |
| 10,564,310 B2 * | 2/2020 | Itskovich | G01V 3/38 |
| 10,942,293 B2 * | 3/2021 | Wiener | G01V 1/306 |
| 11,280,179 B2 * | 3/2022 | Poe, Jr. | E21B 49/003 |
| 2004/0140801 A1 | 7/2004 | Schoen et al. | |
| 2007/0284106 A1 * | 12/2007 | Kalman | E21B 34/02 |
| | | | 166/308.1 |
| 2010/0132448 A1 | 6/2010 | Donadille et al. | |
| 2011/0238312 A1 | 2/2011 | Seydoux | |
| 2011/0074427 A1 | 3/2011 | Wang | |
| 2012/0067644 A1 | 3/2012 | Goswami | |
| 2012/0186873 A1 * | 7/2012 | Shayegi | E21B 21/08 |
| | | | 175/25 |
| 2015/0240631 A1 | 8/2015 | Bittar et al. | |
| 2016/0053597 A1 * | 2/2016 | Brown | E21B 43/26 |
| | | | 166/308.1 |
| 2017/0145793 A1 | 5/2017 | Ouenes | |
| 2018/0145793 A1 | 5/2018 | Sakai et al. | |
| 2018/0230781 A1 | 8/2018 | Garcia et al. | |
| 2019/0025461 A1 | 1/2019 | Wiener et al. | |

\* cited by examiner

ENGINEERING COMPLETION AND SELECTIVE FRACTURING OF LATERAL WELLBORES

CROSS REFERENCE TO RELATED APPLICATIONS

This application claims priority to and the benefit of U.S. Provisional Application Ser. No. 62/807,112 entitled Subsurface Measurement From Drilling or Washdown for Optimizing Fracturing Stages and Water Production, filed Feb. 18, 2019, the entirety of which is incorporated herein by reference.

BACKGROUND INFORMATION

Hydrocarbons (e.g. crude oil and natural gas) have long been recovered from subterranean formations by drilling a wellbore into the subterranean reservoirs. In recent years hydrocarbon recovery has been greatly aided by hydraulic fracturing of subterranean rock by a pressurized liquid such as a mixture of water, chemistry, and a proppant (e.g., sand). The fracturing fluid is injected into the wellbore at high pressure to create a network of fractures in the deep rock formations that are intended to allow hydrocarbons to migrate to the well. When the hydraulic pressure is removed, the proppants hold open the fractures allowing hydrocarbon migration.

Recent advances in directional drilling and hydraulic fracturing technology has made it economically possible to produce oil and gas from new and previously unexploited ultra-low permeability hydrocarbon bearing lithologies (such as shale). A section of the wellbore may be drilled laterally and subsequently fractured so that more of the wellbore, and the corresponding network of formation fractures, is present in the production zone. Such well placement and completion has been shown to enable increased production of hydrocarbons as compared with a vertically oriented well that occupies a relatively small amount of the production zone.

While such drilling and completion techniques have been shown to significantly improve hydrocarbon production, they can also significantly increase the production of water (as water can also migrate through the fractured formation to the wellbore). In certain operations produced water can range from about 25 percent to about 75 percent or more of the total fluid production. Producing water from hydrocarbon bearing formations is not desirable and may significantly increase the cost of hydrocarbon production. Cost estimates range from about $0.50 to about $5.00 per barrel of produced water or more. Reducing water production during wellbore fracturing operations may result in cost savings (e.g., significant cost savings).

SUMMARY

A method for completing a wellbore traversing a subterranean formation is disclosed. The method includes making electromagnetic resistivity measurements along a lateral section of the wellbore. The resistivity measurements are evaluated to estimate a water content of the subterranean formation along the lateral section. The formation is fractured at selected regions along the lateral section at which the water content is below a threshold and avoiding regions at which the water content is above the threshold.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

In some embodiments, a method for drilling and completing subterranean wellbores may include selecting preferred locations for fracturing a subterranean wellbore.

Embodiments of the present application include an engineered completion that includes making resistivity measurements along at least a portion of a lateral section of a subterranean wellbore. The resistivity measurements may include, for example, logging while drilling measurements or wireline resistivity measurements. The method further includes evaluating and/or processing the resistivity measurements, for example, via inversion processing, to estimate formation resistivity and/or total water content in the subterranean formation along the lateral section of the wellbore and fracturing the subterranean wellbore only in regions where the estimated total water content of the formation is less than a predetermined threshold. In certain embodiments, the fracturing operation may only be performed in regions of the wellbore where the measured resistivity is greater than a threshold indicating low water content.

The disclosed embodiments may provide various technical advantages. For example, the disclosed methodology may reduce the total cost of an engineered completion by reducing the number of fracturing stages in the completion. The cost of a single fracturing stage can range from about $30,000 to about $90,000 so the savings can be significant in high water content formations. Moreover, the disclosed methodology may reduce (e.g., significantly reduce) produced water by not fracturing regions of high water content. This can result in improved hydrocarbon recovery and can reduce operational costs (e.g., significantly reduce operational costs) associated with separating the produced water and hydrocarbons and treating the produced water.

Figure 1:
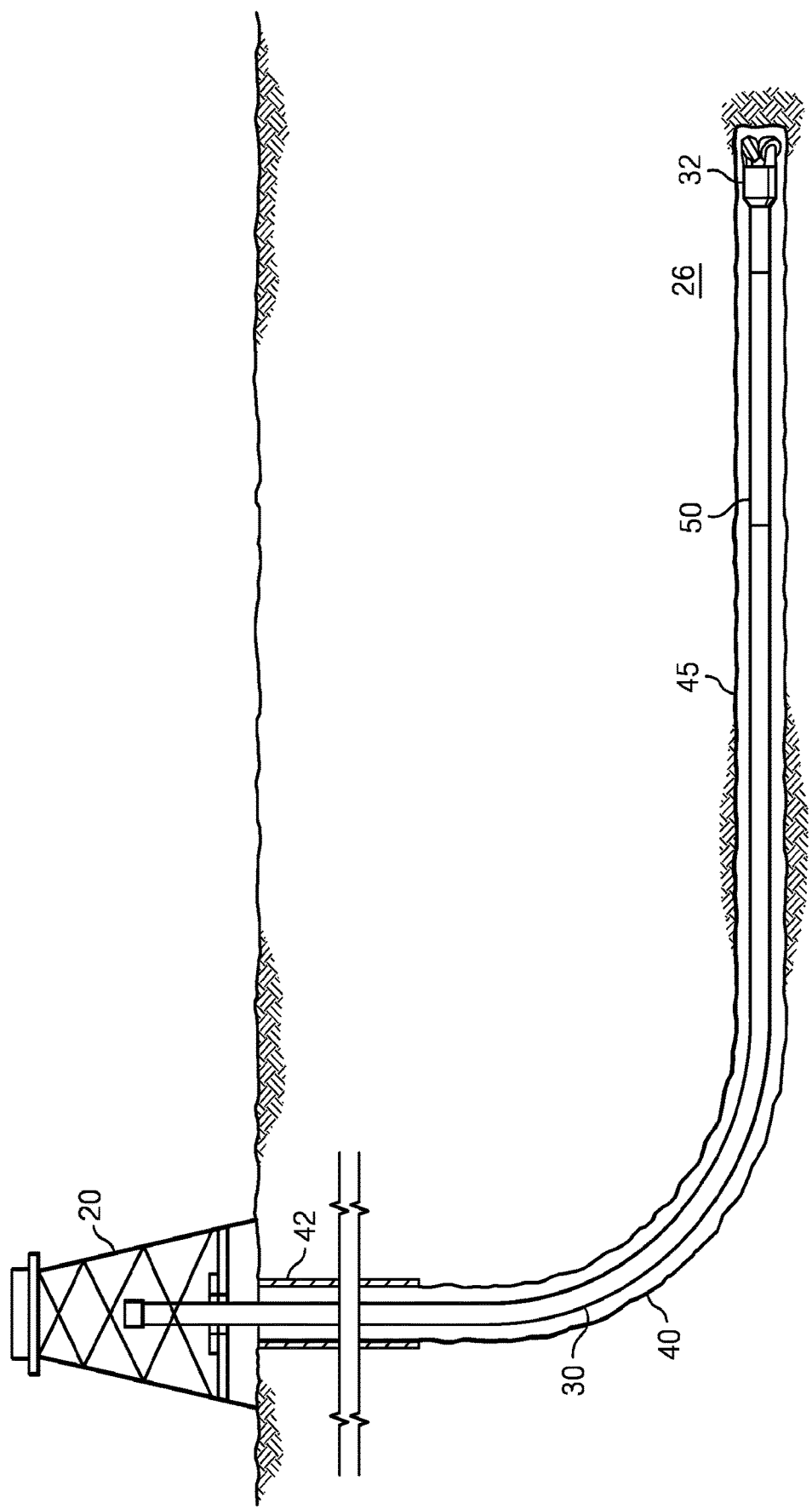
FIG. 1 depicts one example of a rig on which the disclosed methods may be utilized.

FIG. 1 depicts an example drilling rig 20 suitable for employing various method embodiments disclosed herein. The rig 20 is positioned over a subterranean oil or gas formation (e.g., a hydrocarbon bearing shale formation 26). The rig may include, for example, a derrick and a hoisting apparatus for lowering and raising a drill string 30 into an out of the wellbore 40. In the depicted embodiment the drill string 30 includes a drill bit 32 and an electromagnetic logging tool 50. In certain embodiments the electromagnetic logging tool 50 may be used to make logging while drilling resistivity measurements as described in more detail below. As is known to those of ordinary skill in the art, the drill string 30 may further include various other drilling tools such as a downhole drilling motor, a steering tool such as a rotary steerable tool or a bent sub, a downhole telemetry system, and one or more other MWD or LWD tools including various sensors for sensing downhole characteristics of the borehole and the surrounding formation. The disclosed embodiments are of course not limited in these regards.

It will be understood by those of ordinary skill in the art that the deployment illustrated on FIG. 1 is merely an example. For example, disclosed embodiments are not limited to logging while drilling operations. For example, as described in more detail below, the resistivity measurements may be collected using a wireline logging tool after the drilling operation is completed.

With continued reference to FIG. 1, the depicted wellbore is a J-shaped wellbore including a vertical section 42 and a lateral section 45. It will be understood that the disclosed embodiments are not so limited and may include wellbores having substantially any suitable shape provided they include a lateral section from which hydrocarbons may be recovered. By lateral it is meant that the section is non-vertical or approximately horizontal. For example, the lateral section may have a wellbore inclination ranging from about 45 to about 135 degrees.

Figure 2:
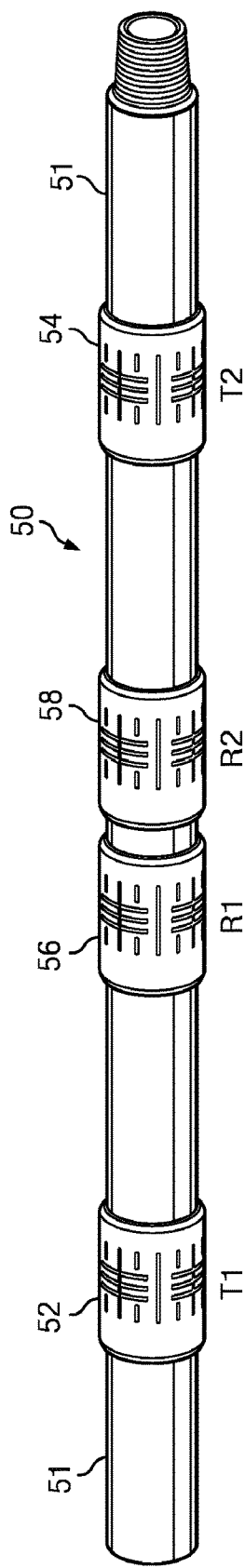
FIG. 2 depicts one example of an electromagnetic logging tool suitable for making formation resistivity measurements.

FIG. 2 depicts one example of an electromagnetic measurement tool 50 for making resistivity or directional resistivity measurements in a wellbore. In the depicted example embodiment, measurement tool 50 includes first and second axially spaced transmitters 52 and 54 and first and second axially spaced receivers 56 and 58 deployed on a logging while drilling tool body 51, with the receivers 56 and 58 being deployed axially between the transmitters 52 and 54. Each of the transmitters 52 and 54 and receivers 56 and 58 may include one or more antennae for transmitting and receiving electromagnetic energy. The antennae may include an axial, transverse, and/or tilted antennae. For example, the transmitters and receivers may include a tri-axial antenna arrangement including an axial antenna and first and second transverse antennas that are orthogonal to one another.

As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312). A tilted antenna is one whose moment is neither parallel nor perpendicular with the tool axis (e.g., being oriented at a 45 degree angle with respect to the tool axis).

As is known to those of ordinary skill in the art, electromagnetic measurements may be made by applying a time varying electric current (an alternating current) in a transmitting antenna to produce a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in the receiving antennae. The voltage responses are measured and can be processed, for example, using inversion processing, as is also known to those of ordinary skill in the art, to obtain one or more properties of the formation including a resistivity of a near bed, a vertical resistivity and a horizontal resistivity of a near bed, a distance to a bed boundary (e.g., above and below the lateral section of the wellbore), and a resistivity of a remote bed (e.g., a bed located above or below the wellbore). As still further known to those of ordinary skill, these properties may be further evaluated to estimate hydrocarbon content and water content of the formation.

Figure 3:
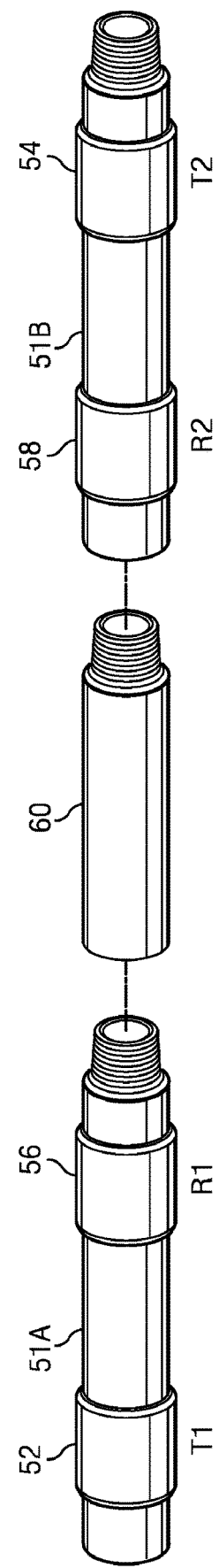
FIG. 3 depicts one example of a deep reading electromagnetic logging tool suitable for making formation resistivity measurements.

FIG. 3 depicts one example of a deep reading electromagnetic logging tool 50' for making resistivity or directional resistivity measurements in a wellbore. Deep reading electromagnetic logging tool 50' is similar to logging tool 50 in that it includes first and second axially spaced transmitters 52 and 54 and first and second axially spaced receivers 56 and 58. However, the first and second transmitters and the first and second receivers are deployed on corresponding first and second subs 51A and 51B. The first and second subs 51A and 51B may be axially spaced apart substantially any suitable distance to achieve a desired measurement depth (e.g., via a spacer sub or other bottom hole assembly component as depicted at 60). Logging tool 50' may otherwise be substantially identical to logging tool 50, however, the disclosed embodiments are not limited in these regards.

Figure 4:
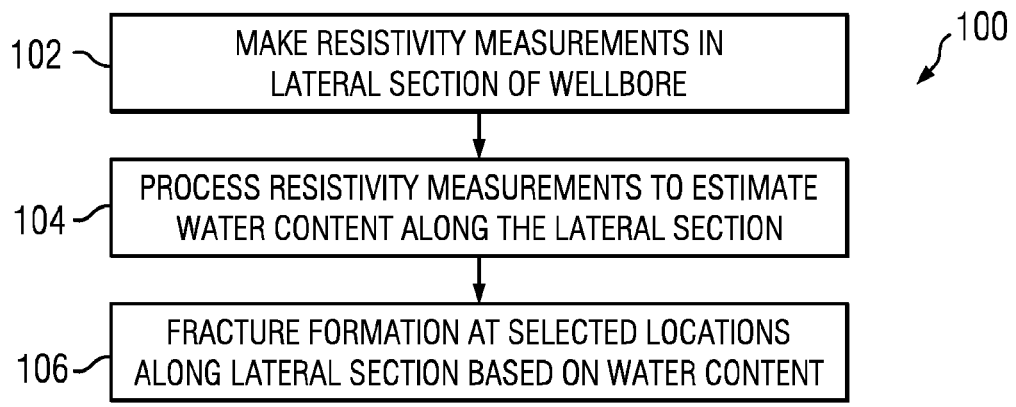
FIG. 4 depicts a flow chart of a disclosed method embodiment.

FIG. 4 depicts a flow chart of a disclosed method embodiment for an engineering completion. The method 100 includes making resistivity measurements in a lateral section of a subterranean wellbore at 102. The measurements may include logging while drilling resistivity measurements or wireline resistivity measurements. While drilling measurements may be made, for example, during a geosteering operation (in which the resistivity measurements are used to guide the direction of drilling) or during a "washdown" operation in which the resistivity measurements are generated automatically and stored to downhole memory for future evaluation. Element 102 may therefore include drilling the lateral section of the wellbore and making resistivity LWD measurements while drilling. Alternatively (and/or additionally), element 102 may include making wireline resistivity measurements on a previously drilled lateral section of a subterranean wellbore. The resistivity measurements may include substantially any suitable resistivity measurements for obtaining formation resistivity values. Deep reading resistivity measurements may be advantageously utilized to obtain deep or remote bed resistivity values.

The resistivity measurements may be made using substantially any suitable commercially available (or experimental) resistivity tools. Suitable resistivity tools include, for example, Periscope®, PeriscopeHD®, and PeriscopeUHD available from Schlumberger. Suitable resistivity tools may also include Geosphere® and GeosphereHD® which are also available from Schlumberger. Deep reading, ultra-deep reading, and high definition resistivity measurements, for example, made using PeriscopeHD®, PeriscopeUHD, and GeosphereHD® may advantageously provide improved accuracy and better defined bed definition. Such tools may also provide deeper measurements, for example, having a depth of investigation of at least 10 feet (or at least 15 feet or at least 20 feet) into the formation.

With continued reference to method 100 in FIG. 4, the resistivity measurements collected at 102 may be evaluated or processed at 104 to estimate formation resistivity measurements and/or a water content of the subterranean formation along the lateral section of the wellbore (e.g., a water content profile or map of the formation). In one embodiment, the resistivity measurements are processed via inversion processing to compute at least one of resistivity of a local bed, vertical and/or horizontal resistivity of a local bed, distance to a remote bed, and a resistivity of a remote bed. These parameters may be further evaluated to estimate the water content of the formation. For example, resistivity values below a predetermined threshold may be indicative of high water content. In one embodiment, a resistivity value of the local formation below the threshold may be indicative of high water content and a propensity to produce water. In another embodiment, a resistivity value of a remote bed below the threshold may be indicative of high water content and a propensity to produce water. In still another embodiment, a resistivity value of a remote bed below the threshold and a distance to the bed below a distance threshold may be indicative of high water content and a propensity to produce water. In yet another embodiment, a resistivity value of a remote bed below the threshold and a distance to the bed above the distance threshold may be indicative of high water content but a may further indicate a lower propensity to produce water (owing to the greater distance to the remote bed). Likewise resistivity values above the threshold may be indicative of low water content and corresponding high hydrocarbon content.

With still further reference to FIG. 4, method 100 may further include fracturing the subterranean formation at 106 at selecting locations in the lateral section of the wellbore. Such fracturing may include not fracturing the subterranean formation at other locations based on the water content estimated in 104. For example, in one advantageous embodiment the wellbore may be fractured only at locations having low water content (below a threshold) such as indicated by resistivity values above a threshold. Alternatively (and/or additionally), the wellbore may not be fractured at locations having high water content (above a threshold) such as indicated by resistivity values below a threshold.

As described above, deep reading resistivity data may be evaluated to determine a water content profile along the length of the lateral section. In one embodiment, the measured depth along the length of the wellbore of regions having high water content (above a threshold) may be flagged to avoid fracturing. Other regions having low water content or high hydrocarbon content may also be flagged for fracturing.

As known to those of ordinary skill in the art a fracturing operation may include (i) cementing a casing in the lateral section of the wellbore, (ii) deploying packers around a selected zone for fracturing, (iii) perforating the casing in the selected zone (between the packers), and (iv) fracturing the formation in the selected zone by pumping high pressure fracking fluid downhole. This process is commonly repeated at numerous locations along the length of the wellbore. For example, the packer assembly may be set near the distal end of the lateral section at a first location for fracturing, the casing perforated, and the selected zone fractured. The packer assembly may then be moved in the uphole direction (towards the surface) to a second flagged location for fracturing and the processed repeated. This process may be repeated until all selected zones are fractured with the flagged regions having high water content being avoided. The packer assembly may then be removed from the completed wellbore.

Figure 5:
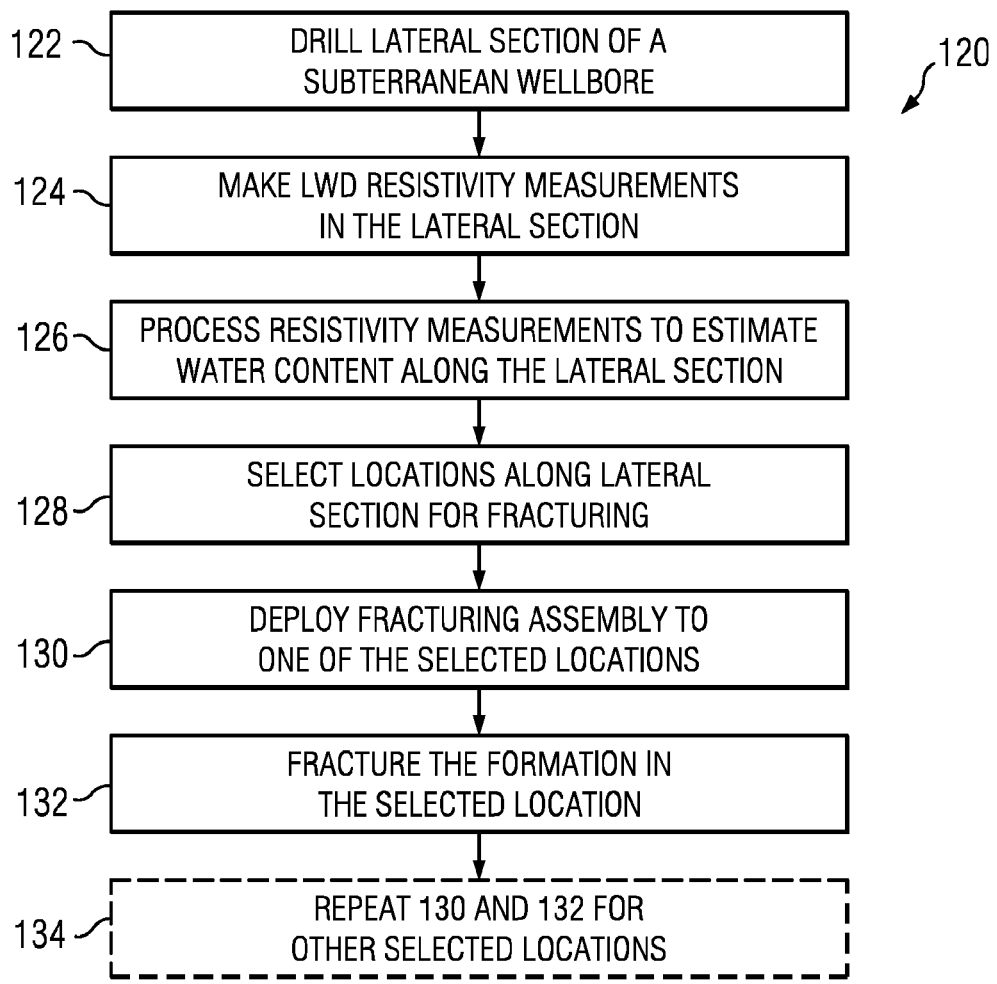
FIG. 5 depicts a flow chart of another disclosed method embodiment.

FIG. 5 depicts a flow chart of another disclosed method embodiment 120. The method 120 includes drilling a lateral section of a subterranean wellbore at 122, for example, by rotating a drill string in the wellbore. Logging while drilling resistivity measurements are made at 124 in the later section, for example, as described above with respect to FIG. 4. The resistivity measurements made at 124 may be evaluated at 126 to estimate formation resistivity and/or a water content of the subterranean formation along the lateral section of the wellbore as also described above with respect to FIG. 4. At 128 locations for fracturing the subterranean formation may be selected based on the water content estimates and/or the resistivity measurements. For example, as described above, the locations having a water content below a predetermined threshold may be selected for fracturing with locations having a water content above the threshold being tagged for avoidance (i.e., as locations to be avoided in subsequent fracturing operations). Likewise, locations having formation resistivity above a predetermined resistivity threshold may be selected for fracturing with locations having a formation resistivity below the threshold being tagged for avoidance.

With continued reference to FIG. 5, a fracturing assembly may be deployed in the wellbore at 130 at one of the selected locations in the lateral section. Such deployment may optionally occur after a casing is cemented in the lateral section. The fracturing assembly may include substantially any suitable assembly for fracturing a selected zone (or location) of the formation, for example, including packers and a perforating gun or other assembly. The packers may be deployed about the selected location thereby isolating the location from the remainder of the wellbore. The selected location may be fractured at 132, for example, by perforating a cement casing (when present) in the selected zone (between the packers) and pumping high pressure fracking fluid downhole to fracture the formation at the selected location. Elements 130 and 132 may optionally be repeated substantially any suitable number of times at other ones of the selected locations while avoiding the non-selected locations (locations having high water content and/or low formation resistivity).

Figure 6:
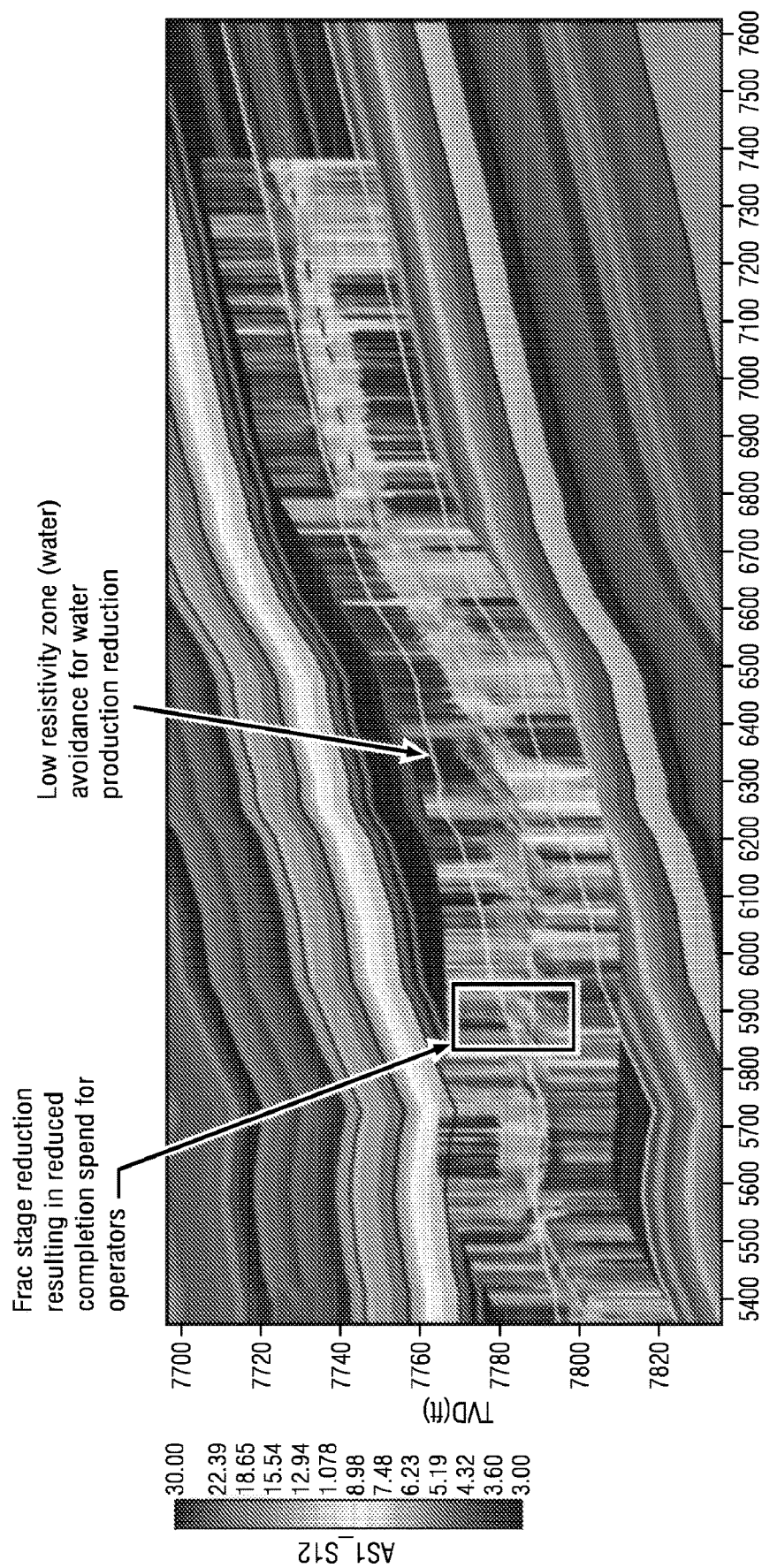
FIGS. 6 and 7 depict pseudo-color resistivity logs of a lateral section of a subterranean wellbore.
Figure 7:
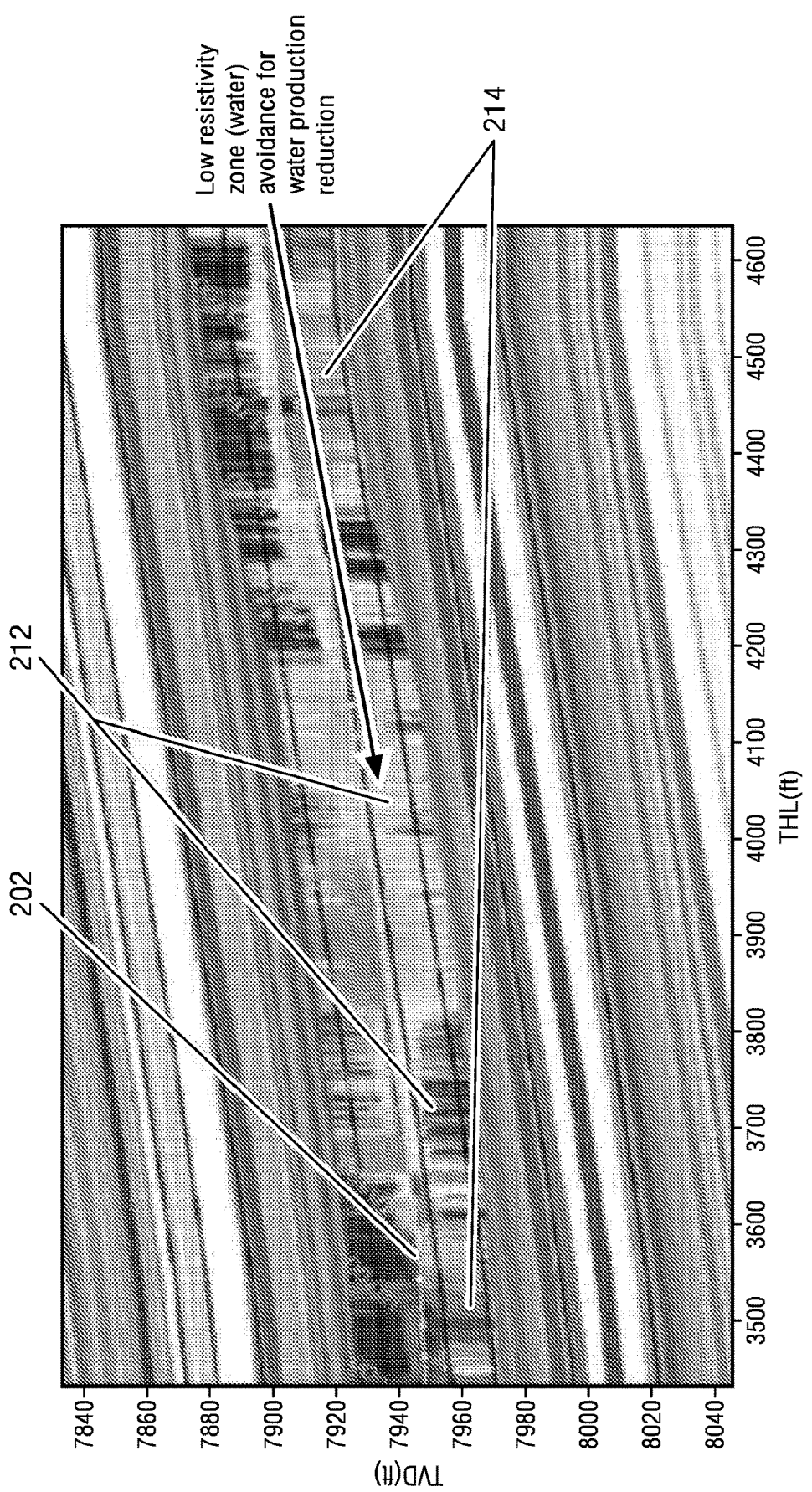

FIGS. 6 and 7 depict pseudo colored resistivity logs (also referred to as maps or profiles) along a lateral section of a wellbore (e.g., made in 102 or 124 of methods 100 and 120 in FIGS. 4 and 5). The wellbore is depicted at 202 in green with measured depth indicated in green numerals. The logs depict inverted resistivity profiles of directional resistivity data obtain using a Schlumberger PeriScopeHD® logging while drilling tool. Resistivity values are depicted in pseudo-color contour with blue denoting lower resistivity indicative of higher water content and orange/red/brown denoting higher resistivity indicative of lower water content. The resistivity map on FIG. 7 shows a long zone of low resistivity (high water content) at 212 that may be advantageously avoided during a subsequent fracturing operation to minimize water production. Zones having higher resistivity (and corresponding lower water content) are depicted at 214 and may be advantageously fractured.

It will be understood that portions of methods 100 and 120 shown on FIGS. 4 and 5 may be implemented on an electronic processor, for example, including a computer. The resistivity data may stored to downhole memory and then transferred from the resistivity tool to the processor for subsequent processing and determining the locations of high water content and lower water content zones. The disclosed embodiments are not limited to any particular processors and computer hardware. The disclosed embodiments may include a computer readable medium containing instructions for processing the resistivity data to obtain the water content along the wellbore and for determining the high and low water content zones.

Although engineering completion and selective fracturing of lateral wellbores have been described in detail, it should be understood that various changes, substitutions and alternations can be made herein without departing from the spirit and scope of the disclosure as defined by the appended claims.

What is claimed is:

1. A method for completing a wellbore traversing a subterranean formation, the method comprising:
   (a) making electromagnetic resistivity measurements along a lateral section of the wellbore;
   (b) evaluating the resistivity measurements to estimate a water content of the subterranean formation along the lateral section of the wellbore; and
   (c) fracturing the formation at selected regions along the lateral section at which the water content is below a threshold and avoiding regions at which the water content is above the threshold,
   wherein (c) further comprises (i) cementing a casing in the lateral section of the wellbore, (ii) setting first and second packers to isolate one of the selected regions at which the water content is below the threshold, (iii) perforating the casing in the isolated region, and (iv) pumping high pressure fracking fluid downhole from surface to fracture the subterranean formation in the isolated region.

2. The method of claim 1, wherein:
   (a) further comprises drilling the lateral section of the wellbore; and
   the resistivity measurements include logging while drilling measurements.

3. The method of claim 2, wherein the resistivity measurements are made during a washdown operation.

4. The method of claim 1, wherein the resistivity measurements comprise deep reading resistivity measurements.

5. The method of claim 1, wherein the resistivity measurements have a depth of investigation of at least 10 feet into the formation.

6. The method of claim 1, wherein (b) comprises evaluating the resistivity measurements to estimate at least one of (i) a resistivity of a near bed, (ii) a vertical resistivity and a horizontal resistivity of the near bed, (iii) a distance to a remote bed boundary, and (iv) a resistivity of a remote bed as a function of measured depth in the lateral section of the wellbore.

7. The method of claim 1, wherein the water content is estimated in (b) from a resistivity value of the formation along the lateral section of the wellbore, with a higher resistivity being indicative of low water content and a lower resistivity being indicative of high water content.

8. The method of claim 1, wherein (c) further comprises avoiding regions along the lateral section of the wellbore at which a resistivity of a near bed is less than a resistivity threshold indicative of high water content.

9. The method of claim 1, wherein (c) further comprises avoiding regions along the lateral section of the wellbore at which a resistivity of a remote bed is less than a resistivity threshold indicative of high water content and at which a distance to the remote bed is less than a distance threshold.

10. The method of claim 1, wherein (c) further comprises (v) setting packers at a plurality of other selected regions at which the water content is below the threshold and repeating (iii) and (iv) at each of the selected regions.

* * * * *